(12) United States Patent
Klimpel et al.

(10) Patent No.: US 10,569,886 B2
(45) Date of Patent: Feb. 25, 2020

(54) OPERATING-PHASE-DEPENDENTLY CONTROLLABLE AIRCRAFT AIR CONDITIONING SYSTEM AND METHOD FOR OPERATING SUCH AN AIRCRAFT AIR CONDITIONING SYSTEM

(71) Applicant: Airbus Operations GmbH, Hamburg (DE)

(72) Inventors: Frank Klimpel, Hamburg (DE); Hans Brunswig, Hamburg (DE); Steffen Golle, Dresden (DE); Ullrich Hesse, Affalterbach (DE); Enrico Klausner, Dresden (DE); Mario Raddatz, Coswig (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/790,247

(22) Filed: Oct. 23, 2017

(65) Prior Publication Data

US 2018/0057175 A1  Mar. 1, 2018

Related U.S. Application Data

(63) Continuation of application No. PCT/EP2016/059037, filed on Apr. 22, 2016.

(30) Foreign Application Priority Data

Apr. 23, 2015 (DE) .................. 10 2015 207 436
Apr. 23, 2015 (DE) .................. 10 2015 207 439
Apr. 23, 2015 (DE) .................. 10 2015 207 447

(51) Int. Cl.
*B64D 13/08* (2006.01)
*B64D 13/06* (2006.01)
*F24F 5/00* (2006.01)
*F25B 5/02* (2006.01)

(52) U.S. Cl.
CPC ............. *B64D 13/06* (2013.01); *B64D 13/08* (2013.01); *F24F 5/00* (2013.01); *F25B 5/02* (2013.01);
(Continued)

(58) Field of Classification Search
CPC .............................. B64D 13/02; B64D 13/06; B64D 2013/0603; B64D 2013/0625;
(Continued)

(56) References Cited

U.S. PATENT DOCUMENTS 4,263,786 A   4/1981 Eng
4,434,624 A   3/1984 Cronin et al.
(Continued)

FOREIGN PATENT DOCUMENTS

CN   102892674 A   1/2013
EP      2735510      5/2014
(Continued)

OTHER PUBLICATIONS

International Search Report, dated Jul. 4, 2016, priority document.
(Continued)

*Primary Examiner* — Jonathan Bradford
(74) *Attorney, Agent, or Firm* — Greer, Burns & Crain, Ltd.

(57) ABSTRACT

An aircraft air conditioning system includes an ambient air line which is configured have ambient air flow therethrough and is connected to a mixer of the aircraft air conditioning system to supply ambient air to the mixer, and a refrigerating machine which includes a refrigerant circuit configured to have a refrigerant flow therethrough, the refrigerant circuit being thermally coupled to the ambient air line to transfer heat, from the ambient air flowing through the ambient air line, to the refrigerant circulating in the refrigerant circuit, before the ambient air is supplied into the mixer. A control
(Continued)

device is configured to control the ambient air flow through the ambient air line such that the ambient air is selectively conducted through different sections of the ambient air line or different bypass lines running parallel to the sections of the ambient air line.

15 Claims, 1 Drawing Sheet

(52) U.S. Cl.
CPC .............. *B64D 2013/0625* (2013.01); *B64D 2013/0644* (2013.01); *B64D 2013/0662* (2013.01); *B64D 2013/0674* (2013.01); *B64D 2013/0688* (2013.01); *Y02T 50/44* (2013.01); *Y02T 50/56* (2013.01)

(58) Field of Classification Search
CPC .... B64D 2013/0648; B64D 2013/0662; B64D 2013/0644; B64D 2013/0688; F25B 5/02; Y02T 50/56
See application file for complete search history.

(56) References Cited

U.S. PATENT DOCUMENTS

| | | | | |
|---|---|---|---|---|
| 5,086,622 A | * | 2/1992 | Warner | B64D 13/06 62/172 |
| 5,918,472 A | * | 7/1999 | Jonqueres | B64D 13/06 62/172 |
| 9,511,868 B2 | | 12/2016 | Stengel et al. | |
| 2010/0064701 A1 | | 3/2010 | Bruno et al. | |
| 2011/0108239 A1 | * | 5/2011 | Bruno | B64D 13/06 165/104.19 |
| 2014/0144163 A1 | | 5/2014 | Klimpel et al. | |

FOREIGN PATENT DOCUMENTS

| | | |
|---|---|---|
| EP | 2821346 | 1/2015 |
| GB | 773248 | 4/1957 |

OTHER PUBLICATIONS

German Search Report, dated Apr. 19, 2016, priority document.
S. Golle, U. Hesse, M. Raddatz, E. Klausner, F. Klimpel: "Pneumatisch angetriebenes Kaltdampfkühlsystem für die Flugzeugklimatisierung", DKV-Tagung, Hannover, Nov. 20-22, 2014.
S. Golle, U. Hesse, F. Klimpel: "Pneumatically driven environmental control system in aircrafts based on a vapor-compression cycle" 15th International Refrigeration and Air conditioning Conference at Purdue, Jul. 14-17, 2014.
Chinese Examination Report for corresponding Chinese Patent Application No. 201680023383.1 dated Oct. 31, 2019.

* cited by examiner

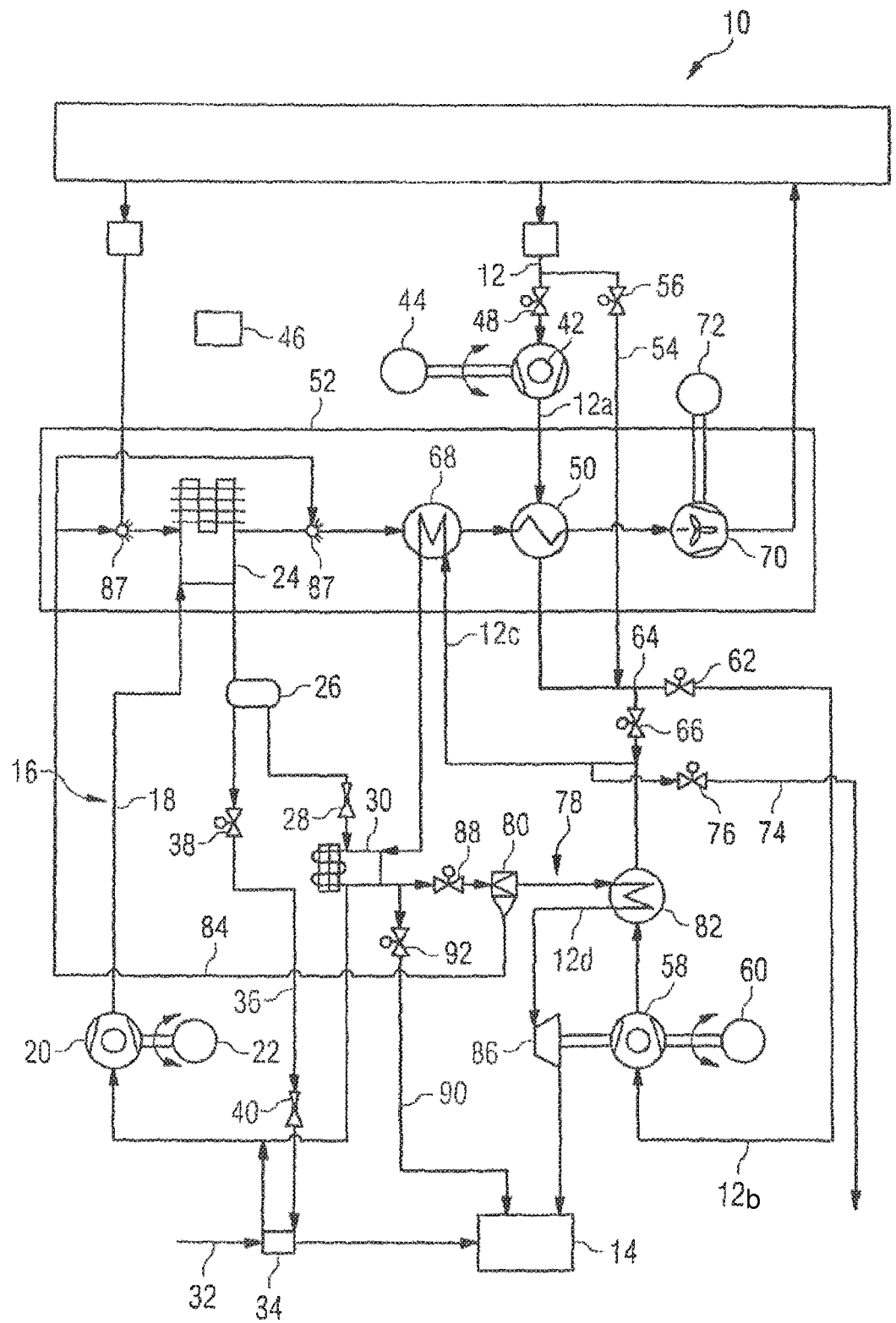

OPERATING-PHASE-DEPENDENTLY CONTROLLABLE AIRCRAFT AIR CONDITIONING SYSTEM AND METHOD FOR OPERATING SUCH AN AIRCRAFT AIR CONDITIONING SYSTEM

CROSS-REFERENCES TO RELATED APPLICATIONS

This application is a continuation of International Application PCT/EP2016/059037 filed Apr. 22, 2016, designating the United States and published on Oct. 27, 2016 as WO 2016/170128. This application also claims the benefit of the German patent application Nos. 10 2015 207 436.6 filed on Apr. 23, 2015, 10 2015 207 439.0 filed on Apr. 23, 2015 and 10 2015 207 447.1 filed on Apr. 23, 2015. The entire disclosures of the above are incorporated herein by way of reference.

BACKGROUND OF THE INVENTION

The invention relates to an operating-phase-dependently controllable aircraft air conditioning system and a method for operating such an aircraft air conditioning system.

An aircraft air conditioning system serves for setting and maintaining a desired pressure, a desired temperature and a desired atmospheric humidity in an aircraft cabin. Furthermore, the aircraft air conditioning system supplies sufficient fresh air into the aircraft cabin to ensure that there is a prescribed minimum proportion of fresh air in the aircraft cabin. From EP 2 735 510 A1 or US 2014/0144163 A1 there is known an aircraft air conditioning system in which a refrigerating machine operated with a two-phase refrigerant is used to cool ambient air compressed by a multi-stage compressor. The refrigerating machine comprises a refrigerant circuit, in which are arranged a compressor, a condenser, an expansion valve, and an evaporator through which flows ambient air to be cooled. Bleed air drawn from an engine or an auxiliary engine of the aircraft is used to drive the compressor of the refrigerating machine and to drive the multistage compressor for compressing the ambient air.

SUMMARY OF THE INVENTION

An object on which the invention is based is to provide an aircraft air conditioning system which enables an energy-efficient air conditioning of an aircraft cabin. Further, an object on which the invention is based is to specify a method for operating such an aircraft air conditioning system.

An aircraft air conditioning system comprises an ambient air line, which is configured to have ambient airflow therethrough and which is connected to a mixer of the aircraft air conditioning system in order to supply ambient air, drawn from an aircraft's surroundings, to the mixer. The mixer connected to the ambient air line may be a pre-mixer or a main mixer of the aircraft air conditioning system, to which mixer is supplied, besides the ambient air from the ambient air line, recirculation air discharged from an aircraft cabin to be air conditioned by means of the aircraft air conditioning system. In the mixer, the ambient air from the ambient air line is mixed with the recirculation air discharged from aircraft cabin. The mixed air produced in the mixer is finally used for air conditioning the aircraft cabin.

A refrigerating machine of the aircraft air conditioning system comprises a refrigerant circuit configured to have a refrigerant flow therethrough, which refrigerant circuit is thermally coupled to the ambient air line in order to transfer heat, from the ambient air flowing through the ambient air line, to the refrigerant circulating in the refrigerant circuit, before the ambient air is supplied into the mixer.

A control device of the aircraft air conditioning system is configured to control the ambient air flow through the ambient air line in such a way that the ambient air is firstly selectively conducted through a first section of the ambient air line or a first bypass line. In the first section of the ambient air line there is arranged a, for example speed-regulated, first ambient air compressor for compressing the ambient air flowing through the first section of the ambient air line. The first bypass line runs parallel to the first section of the ambient air line. Ambient air which flows through the first bypass line is thus conducted past the first section of the ambient air line and consequently the first ambient air compressor.

Further, the control device of the aircraft air conditioning system is configured to control the ambient air flow through the ambient air line in such a way that the ambient air is subsequently selectively conducted through a second section of the ambient air line or a second bypass line. The second section of the ambient air line is arranged, with reference to the flow direction of the ambient air through the ambient air line, in particular downstream of the first section of the ambient air line and the first bypass line. The ambient air supplied to the second section of the ambient air line can consequently be conducted from the first section of the ambient air line or the first bypass line into the second section of the ambient air line.

In the second section of the ambient air line there is arranged a, for example speed-regulated, second ambient air compressor for compressing the ambient air flowing through the second section of the ambient air line, it being possible for the ambient air supplied to the second ambient air compressor to be ambient air pre-compressed in the first ambient air compressor or to be ambient air supplied to the second ambient air compressor untreated through the first bypass line. The second bypass line runs parallel to the second section of the ambient air line. Ambient air which flows through the second bypass line is thus conducted past the second section of the ambient air line and consequently the second ambient air compressor.

The control device of the aircraft air conditioning system is further configured to control the ambient air flow through the ambient air line in such a way that the ambient air is subsequently conducted through the third section of the ambient air line. The third section of the ambient air line is arranged, with reference to the flow direction of the ambient air through the ambient air line, in particular downstream of the second section of the ambient air line and the second bypass line. The ambient air supplied to the third section of the ambient air line can consequently be conducted from the second section of the ambient air line, or via the second bypass line bypassing the second section of the ambient air line from the first section of the ambient air line or the first bypass line, into the third section of the ambient air line.

The third section of the ambient air line is thermally coupled to the refrigerant circuit of the refrigerating machine, it being possible for the thermal coupling between the third section of the ambient air line and the refrigerant circuit to be established, for example, via the heat exchanger arranged in the refrigerant circuit. The cooling of the ambient air in the ambient air line by heat transfer to the refrigerant circulating in the refrigerant circuit of the refrigerating machine takes place, accordingly, on flowing through the third section of the ambient air line.

Finally, the control device of the aircraft air conditioning system is configured to control the ambient air flow through the ambient air line in such a way that the ambient air is subsequently selectively conducted through a fourth section of the ambient air line or a third bypass line. The fourth section of the ambient air line is arranged, with reference to the flow direction of the ambient air through the ambient air line, in particular downstream of the third section of the ambient air line. In the fourth section of the ambient air line there is arranged a turbine for expanding the ambient air flowing through the fourth section of the ambient air line. The third bypass line runs parallel to the fourth section of the ambient air line. Ambient air which flows through the third bypass line is thus conducted past the fourth section of the ambient air line and consequently the turbine.

In cooperation with an ambient air compressor, the turbine arranged in the fourth section of the ambient air line enables the realization of a cold air process, in which the ambient air flowing through the ambient air line is firstly compressed and subsequently expanded again and in doing so is cooled to a desired low temperature before it is supplied into the mixer of the aircraft air conditioning system. The turbine may be arranged with the second ambient air compressor, arranged in the second section of the ambient air line, on a common shaft.

In the aircraft air conditioning system, accordingly, as required, either exclusively the cooling process taking place in the refrigerating machine, or both the cooling process taking place in the refrigerating machine and the cold air process realized by an ambient air compressor and the turbine, may be used for conditioning and cooling the ambient air flowing through the ambient air line. An operation of the aircraft air conditioning system with exclusive use of the cooling process taking place in the refrigerating machine is suitable, in particular, in operating phases of the aircraft air conditioning system in which the ambient air flowing through the ambient air line has only a low moisture content. This is the case, for example, when an aircraft equipped with the aircraft air conditioning system is cruising. Through a pre-compression of the ambient air flowing through the ambient air line by one of the ambient air compressors, before it is cooled by the transfer of heat to the refrigerant circulating in the refrigerant circuit to a desired temperature, the efficiency of the cooling process taking place in the refrigerating machine can then, moreover, be controlled as required.

An operation of the aircraft air conditioning system using both the cooling process taking place in the refrigerating machine and the cold air process is expedient, in particular, if the ambient air flowing through the ambient air line has to be dehumidified before it is supplied into the mixer of the aircraft air conditioning system. This is the case, for example, when an aircraft equipped with the aircraft air conditioning system is on the ground, and climbing or descending.

Finally, by switching off the refrigerating machine, an operation of the aircraft air conditioning system using exclusively the cold air process is also possible. This is expedient if the aircraft cabin is to be heated by means of the aircraft air conditioning system. An operation of the aircraft air conditioning system using exclusively the cold air process is also possible as an emergency operation in the event of a failure of the refrigerating machine. In such an emergency operation, both ambient air compressors may be used for compressing the ambient air flowing through the ambient air line, whereby it becomes possible to supply the aircraft cabin with a sufficient amount of conditioned and cooled ambient air even if, in an aircraft air conditioning system equipped with two air conditioning units, one air conditioning unit fails completely and in addition the refrigerating machine of the second air conditioning unit is no longer capable of functioning.

Thus, in different operating phases of the aircraft air conditioning system, the operation of the aircraft air conditioning system can be optimally adapted to the air conditioning requirements placed on the aircraft air conditioning system. The aircraft air conditioning system can therefore be operated flexibly and energy-efficiently.

The control device of the aircraft air conditioning system is preferably configured to control the first ambient air compressor in such a way that it compresses the ambient air flowing through the first section of the ambient air line, which, when an aircraft equipped with the aircraft air conditioning system is flying, may have a pressure lying markedly below the atmospheric pressure at sea level, to a pressure which corresponds substantially only to a set cabin pressure in an aircraft cabin to be air conditioned. The first ambient air compressor can therefore be operated very energy-efficiently.

The control device of the aircraft air conditioning system is preferably further configured to control the second ambient air compressor in such a way that it compresses the ambient air flowing through the second section of the ambient air line to a pressure which is greater than the set cabin pressure in the aircraft cabin to be air conditioned. If the second ambient air compressor compresses the ambient air flowing through the ambient air line to a pressure which is greater than the set cabin pressure in the aircraft cabin to be air conditioned, an effective and efficient cold air process can be realized by the second ambient air compressor and the turbine arranged in the fourth section of the ambient air line.

Further, a water separating device, preferably an efficient high-pressure water separating device, may be arranged in the fourth section of the ambient air line. The compression of the ambient air to a pressure in the second ambient air compressor lying above the set cabin pressure enables excess water in the water separating device arranged in the fourth section of the ambient air line to be removed from the ambient air flow.

The water separating device, which, with reference to the flow direction of the ambient air through the ambient air line, is preferably arranged upstream of the turbine in the fourth section of the ambient air line, may comprise a water separator. On flowing through the water separator, the ambient air is dehumidified to such an extent as to ensure that not too much moisture is supplied to the aircraft cabin to be air conditioned. Water separated in the water separator from the ambient air flowing through the fourth section of the ambient air line may be injected via a water injection into a ram air duct. The water which partly evaporates there cools the ram air and increases the energy efficiency of the aircraft air conditioning system.

Further, the water separating device may comprise a reheater, arranged downstream of the water separator with reference to the flow direction of the ambient air through the ambient air line, for heating the ambient air flowing through the fourth section of the ambient air line before it is supplied into the turbine. The reheater may establish a thermal coupling between the fourth section of the ambient air line and the second section of the ambient air line. In particular, the reheater may bring hot ambient air, flowing through the second section of the ambient air line after its compression in the second ambient air compressor, into thermal contact with the ambient air, flowing through the fourth section of the ambient air line, before it is supplied into the turbine. In the reheater, water drops remaining in the ambient air flow after flowing through the water separator are evaporated in order to protect the turbine from damage due to drop impingement or cavitation. Furthermore, the reheater increases the power output of the turbine.

Even if the second ambient air compressor compresses the ambient air flowing through the second section of the ambient air line to a pressure which is greater than the set cabin pressure in the aircraft cabin to be air conditioned, the operation of the first and of the second ambient air compressor are, however, preferably controlled such that the temperature of the compressed ambient air does not exceed a maximum temperature of, for example, 160° C. As a result, an insulation and ventilation of an installation space provided in an aircraft for the aircraft air conditioning system can be dispensed with. This enables weight and cost savings.

The control device is, in particular, configured to control the ambient air flow through the ambient air line in such a way that when an aircraft equipped with the aircraft air conditioning system is on the ground the ambient air is firstly conducted through the first bypass line, subsequently through the second section of the ambient air line, subsequently through the third section of the ambient air line and finally through the fourth section of the ambient air line. Thus, when an aircraft equipped with the aircraft air conditioning system is on the ground, the ambient air, on flowing through the second ambient air compressor arranged in the second section of the ambient air line, can be compressed to a pressure lying above the set cabin pressure which enables a dehumidification of the ambient air in the water separating device provided in the fourth section of the ambient air line. By contrast, the first ambient air compressor arranged in the first section of the ambient air line is bypassed. The cooling of the ambient air is effected both by the transfer of heat to the refrigerant circuit of the refrigerating machine and by the expansion of the ambient air in the turbine arranged in the fourth section of the ambient air line.

The control device is preferably further configured to control the ambient air flow through the ambient air line in such a way that when an aircraft equipped with the aircraft air conditioning system is climbing or descending the ambient air is firstly conducted through the first section of the ambient air line, subsequently through the second section of the ambient air line, subsequently through the third section of the ambient air line and finally through the fourth section of the ambient air line. Thus, when an aircraft equipped with the aircraft air conditioning system is climbing or descending, the first ambient air compressor arranged in the first section of the ambient air line and the second ambient air compressor arranged in the second section of the ambient air line are connected in series, in order to compress the ambient air flowing through the ambient air line to a pressure which enables a dehumidification of the ambient air in the water separating device provided in the fourth section of the ambient air line even if the efficiency of the water separator decreases.

Through the series connection of the ambient air compressors, both ambient air compressors can be operated at high power requirements in their optimal map range. The cooling of the ambient air is effected, as on the ground, both by the transfer of heat to the refrigerant circuit of the refrigerating machine and by the expansion of the ambient air in the turbine arranged in the fourth section of the ambient air line.

Finally, the control device may be configured to control the ambient air flow through the ambient air line in such a way that when an aircraft equipped with the aircraft air conditioning system is cruising the ambient air is firstly conducted through the first section of the ambient air line, subsequently through the second bypass line, subsequently through the third section of the ambient air line and finally through the third bypass line. Thus, when an aircraft equipped with the aircraft air conditioning system is cruising, the ambient air flowing through the ambient air line is compressed exclusively by the first ambient air compressor arranged in the first section of the ambient air line to the set cabin pressure, since a dehumidification of the ambient air which is very dry when an aircraft is at cruising altitude is not necessary. Accordingly, the second ambient air compressor arranged in the second section of the ambient air line is bypassed as are the water separating device provided in the fourth section of the ambient air line and the turbine likewise provided in the fourth section of the ambient air line. The cooling of the ambient air is effected exclusively by the transfer of heat to the refrigerant circuit of the refrigerating machine.

In a preferred embodiment, the aircraft air conditioning system comprises at least one electric motor for driving the first and/or the second ambient air compressor and/or a refrigerant compressor arranged in the refrigerant circuit of the refrigerating machine. For example, the aircraft air conditioning system may comprise a first electric motor for driving the refrigerant compressor. The first ambient air compressor is preferably driven by a second electric motor. The second ambient air compressor is preferably driven by a third electric motor. In the aircraft air conditioning system, bleed air drawn from an engine or an auxiliary engine of the aircraft is then dispensed with not only for the provision of air conditioning air, but also for driving at least one ambient air compressor and/or the refrigerant compressor. As a result, the fuel consumption of the engine or auxiliary engine is reduced. Further, the use of an electric drive for at least one of the ambient air compressors and/or the refrigerant compressor and the use of ambient air for providing air conditioning air enable a complete decoupling of the energy supply and fresh-air supply to the aircraft air conditioning system. As a result, the energy supply and fresh-air supply can be optimized independently of one another and adapted, for example, to the operating conditions of the aircraft air conditioning system. The aircraft air conditioning system can then be operated particularly energy-efficiently.

The refrigerant circulating in the refrigerant circuit of the refrigerating machine is preferably a two-phase refrigerant which on the absorption of heat from the ambient air flowing through the ambient air line is converted from the liquid to the gaseous state of aggregation and subsequently by appropriate pressure and temperature control in the refrigerant circuit of the refrigerating machine is converted back to the liquid state of aggregation again. For example, R134A (CH2F—CF3), CO2 or R-245fa (1,1,1,3,3-pentafluoropropane) may be circulated as two-phase refrigerant in the refrigerant circuit of the refrigerating machine. The cooling process used for cooling the ambient air flowing through the ambient air line is therefore preferably realized as a cold vapor process, which is distinguished by a high energy efficiency.

In the refrigerant circuit of the refrigerating machine besides the refrigerant compressor driven preferably by a first electric motor there may be further be arranged a condenser, a refrigerant collector and an expansion valve. Furthermore, the refrigerant circuit is preferably thermally coupled to the ambient air line via a heat exchanger, in order to transfer heat from the ambient air flowing through the ambient air line to the refrigerant circulating in the refrigerant circuit before the ambient air is fed into the mixer. Therefore, also a heat exchanger for establishing the thermal coupling between the refrigerant circuit of the refrigerating machine may be arranged in the refrigerant circuit of the refrigerating machine. The heat exchanger used for establishing the thermal coupling between the refrigerant circuit of the refrigerating machine and the ambient air line preferably is designed in the form of an evaporator.

Preferably, the pressure and temperature control in the refrigerant circuit of the refrigerating machine is effected in such a way that the cold vapor process taking place in the refrigerant circuit takes place predominantly in the two-phase region of the two-phase refrigerant, whereby isothermals and isobars coincide. As a result, the cold vapor process approaches the theoretical optimal Carnot cycle, enabling a particularly efficient cooling of the ambient air flowing through the ambient air line.

The refrigerant circuit of the refrigerating machine may further preferably be thermally coupled to a recirculation air line configured to have recirculation air flow therethrough in order to transfer heat from the recirculation air flowing through the recirculation air line to the refrigerant flowing through the refrigerant circuit. The recirculation air line is preferably connected to the mixer of the aircraft air conditioning system in order to supply recirculation air to the mixer. If the refrigerating machine is used not only for cooling the ambient air flowing through the ambient air line, but also for cooling recirculation air discharged from the aircraft cabin to be air conditioned, the recirculation air can be cooled, before being supplied into the mixer of the aircraft air conditioning system, to the same low temperature as the ambient air flowing through the ambient air line.

Consequently, it is possible to dispense with the cooling of the ambient air, by heat transfer to the refrigerant circulating in the refrigerant circuit of the refrigerating machine, to a temperature lying below a desired set cabin supply air temperature, with the result that the operating efficiency of the aircraft air conditioning system is further improved. Further, an operation of the refrigerating machine at relatively high minimum refrigerant temperatures is enabled, so that the risk of icing for components arranged in the refrigerant circuit of the refrigerating machine, for example the heat exchanger or the condenser, can be minimized.

The refrigerant circuit of the refrigerating machine may be thermally coupled to the recirculation air line via a further heat exchanger, in particular a further evaporator. The further heat exchanger is preferably arranged in a connection line that branches off from the refrigerant circuit of the refrigerating machine upstream of the heat exchanger which thermally couples the refrigerant circuit to the ambient air line and that opens back into the refrigerant circuit of the refrigerating machine downstream of the heat exchanger which thermally couples the refrigerant circuit to the ambient air line. The terms "upstream" and "downstream" here refer to the direction of flow of the refrigerant through the refrigerant circuit. In particular, the connection line branches off from the refrigerant collector arranged in the refrigerant circuit. Such a design of the refrigerant circuit makes it possible to provide the heat exchanger used for cooling the ambient air flowing through the ambient air line and the further heat exchanger used for cooling the recirculation air flowing through the recirculation air line with refrigerant in parallel and to regulate them independently of one another.

The refrigerant collector is used in this case as a refrigerant buffer, which guarantees an adequate provision of refrigerant to both heat exchangers.

In the connecting line, there may be arranged a control valve which is configured to control the refrigerant flow through the connecting line. Through appropriate control of the control valve the refrigerant flow through the connecting line can be adapted to the cooling requirement of the recirculation air to be cooled. Further, through appropriate control of the control valve the refrigerant circulating in the refrigerant circuit of the refrigerating machine can be distributed to the heat exchanger for cooling the ambient air and the further heat exchanger for cooling the recirculation air, depending on the cooling requirement of the recirculation air to be cooled. This enables, if required, a prioritizing of the heat exchanger or the further exchanger on the supplying with coolant.

Further, a further expansion valve may be arranged in the connecting line. Through the further expansion valve arranged in the connecting line, with reference to the flow direction of the refrigerant through the refrigerant circuit, upstream of the further heat exchanger, the pressure and the temperature of the refrigerant flowing through the connecting line can be set as desired before the refrigerant is conducted into the further heat exchanger.

In the first section of the ambient air line there may be arranged a first valve which may be configured to control the ambient air flow through the first section of the ambient air line. Further, there may be arranged in the first section of the ambient air line a first pre-cooler for pre-cooling ambient air compressed by the first ambient air compressor. The first pre-cooler is preferably arranged in a ram air duct and configured to have ram air flow therethrough conducted through the ram air duct. In the first pre-cooler, the ambient air which has been heated by the compression in the first ambient air compressor is cooled to a desired lower temperature again. In the first bypass line, there is preferably arranged a second valve which is configured to control the ambient air flow through the first bypass line. Through appropriate control of the first valve arranged in the first section of the ambient air line and of the second valve arranged in the first bypass line, the ambient air may, as required, be selectively conducted either through the first section of the ambient air line or the first bypass line.

In the second section of the ambient air line there may be arranged a third valve which may be configured to control the ambient air flow through the second section of the ambient air line. In the second bypass line, there is preferably arranged a fourth valve which is configured to control the ambient air flow through the second bypass line. Through appropriate control of the third valve arranged in the second section of the ambient air line and of the fourth valve arranged in the second bypass line the ambient air may, as required, be distributed to the second section of the ambient air line and the second bypass line, but, in particular, selectively conducted either through the second section of the ambient air line or the second bypass line.

In the third section of the ambient air line there is preferably arranged a second pre-cooler for pre-cooling ambient air before the establishment of the thermal coupling between the third section of the ambient air line and the refrigerant circuit of the refrigerating machine. The second pre-cooler is preferably arranged in a ram air duct and configured to be flown through with ram air conducted through the ram air duct. For example, the first pre-cooler and the second pre-cooler may be arranged in a common ram air duct, the first pre-cooler then being positioned in the ram air duct, with reference to the flow direction of the ram air through the ram air duct, preferably downstream of the second pre-cooler.

The condenser of the refrigerating machine may also be arranged in a ram air duct. Preferably, the condenser of the refrigerating machine, the first pre-cooler and the second pre-cooler are arranged in a common ram air duct. The aircraft air conditioning system then has to have only one ram air duct. The condenser of the refrigerating machine is positioned in the ram air duct, with reference to the flow direction of the ram air through the ram air duct, preferably upstream of the second pre-cooler. As a result, a sufficient cooling of the condenser by the ram air flowing through the ram air duct is ensured in all operating phases of the aircraft air conditioning system. In order to ensure a proper through-flow of ram air through the ram air duct when an aircraft equipped with the aircraft air conditioning system is on the ground as well, a fan may further be arranged in the ram air duct in order to convey ram air through the ram air duct. The fan is preferably driven by a fourth electric motor.

Preferably, a trim air line branches off from the third section of the ambient air line. The branching-off of the trim air line from the third section of the ambient air line lies, with reference to the flow direction of the ambient air through the ambient air line, preferably upstream of the thermal coupling of the third section of the ambient air line to the refrigerant circuit of the refrigerating machine and preferably also upstream of the second pre-cooler. As a result, it is ensured that the trim air is drawn at a point of the third section of the ambient air line at which the ambient air flowing through the third section of the ambient air line has the maximum temperature. The trim air flow through the trim air line may be controlled by a trim air valve arranged in the trim air line.

Finally, in the fourth section of the ambient air line there may be arranged a fifth valve which may be configured to control the ambient air flow through the fourth section of the ambient air line. In the third bypass line, there is preferably arranged a sixth valve which is configured to control the ambient air flow through the third bypass line. Through appropriate control of the fifth valve arranged in the fourth section of the ambient air line and of the sixth valve arranged in the third bypass line, the ambient air may, as required, be distributed to the fourth section of the ambient air line and the third bypass line, but in particular selectively conducted either through the fourth section of the ambient air line or the third bypass line.

In a method for operating an aircraft air conditioning system, ambient air is conducted through an ambient air line which is connected to a mixer of the aircraft air conditioning system in order to supply ambient air to the mixer. A refrigerant circuit of a refrigerating machine is thermally coupled to the ambient air line in order to transfer heat, from the ambient air flowing through the ambient air line, to the refrigerant circulating in the refrigerant circuit, before the ambient air is supplied into the mixer. The ambient air flow through the ambient air line is controlled in such a way that the ambient air is firstly selectively conducted through a first section of the ambient air line, in which a first ambient air compressor for compressing the ambient air flowing through the first section of the ambient air line is arranged, or a first bypass line, the ambient air is subsequently selectively conducted through a second section of the ambient air line, in which a second ambient air compressor for compressing the ambient air flowing through the second section of the ambient air line is arranged, or a second bypass line, the ambient air is subsequently conducted through a third section of the ambient air line which is thermally coupled to the refrigerant circuit of the refrigerating machine, and the ambient air is subsequently selectively conducted through a fourth section of the ambient air line, in which a turbine for expanding the ambient air flowing through the fourth section of the ambient air line is arranged, or a third bypass line.

The first ambient air compressor is preferably controlled in such a way that it compresses the ambient air flowing through the first section of the ambient air line, which, when an aircraft equipped with the aircraft air conditioning system is flying, may have a pressure lying markedly below the atmospheric pressure at sea level, to a pressure which corresponds substantially to a set cabin pressure in an aircraft cabin to be air conditioned. The second ambient air compressor may be controlled in such a way that it compresses the ambient air flowing through the second section of the ambient air line to a pressure which is greater than the set cabin pressure in the aircraft cabin to be air conditioned. Further, water may be separated from the ambient air flowing through the fourth section of the ambient air line.

In particular, the ambient air flow through the ambient air line may be controlled in such a way that when an aircraft equipped with the aircraft air conditioning system is on the ground the ambient air is firstly conducted through the first bypass line, subsequently through the second section of the ambient air line, subsequently through the third section of the ambient air line and finally through the fourth section of the ambient air line. When an aircraft equipped with the aircraft air conditioning system is climbing or descending the ambient air flow through the ambient air line is preferably controlled in such a way that the ambient air is firstly conducted through the first section of the ambient air line, subsequently through the second section of the ambient air line, subsequently through the third section of the ambient air line and finally through the fourth section of the ambient air line. When an aircraft equipped with the aircraft air conditioning system is cruising the ambient air flow through the ambient air line is preferably controlled in such a way that the ambient air is firstly conducted through the first section of the ambient air line, subsequently through the second bypass line, subsequently through the third section of the ambient air line and finally through the third bypass line.

The ambient air flow through the first section of the ambient air line is preferably controlled by a first valve arranged in the first section of the ambient air line.

Ambient air compressed by the first ambient air compressor may be pre-cooled by a first pre-cooler arranged in the first section of the ambient air line. The ambient air flow through the first bypass line may be controlled by a second valve arranged in the first bypass line. The ambient air flow through the second section of the ambient air line may be controlled by a third valve arranged in the second section of the ambient air line. The ambient air flow through the second bypass line may be controlled by a fourth valve arranged in the second bypass line. The ambient air may be pre-cooled by a second pre-cooler arranged in the third section of the ambient air line before the establishment of the thermal coupling between the third section of the ambient air line and the refrigerant circuit. Trim air may be branched off from the ambient air flowing through the third section of the ambient air line by a trim air line branching off from the third section of the ambient air line. The ambient air flow through the fourth section of the ambient air line may be controlled by a fifth valve arranged in the fourth section of the ambient air line. The ambient air flow through the third bypass line may be controlled by a sixth valve arranged in the third bypass line.

BRIEF DESCRIPTION OF THE DRAWINGS

A preferred embodiment of the invention will now be explained in more detail with the aid of the appended schematic drawing, in which The FIGURE shows an air conditioning system for air conditioning an aircraft cabin.

DETAILED DESCRIPTION OF THE PREFERRED EMBODIMENTS

An aircraft air conditioning system 10 illustrated in the FIGURE comprises an ambient air line 12, through which ambient air can flow and which is connected to a mixer 14 of the aircraft air conditioning system 10 in order to supply the ambient air, drawn from an aircraft's surroundings, to the mixer 14. The ambient air from the ambient air line 12 is mixed in the mixer 14 with recirculation air discharged from an aircraft cabin. The mixed air produced in the mixer 14 is finally used for the air conditioning of the aircraft cabin.

The aircraft air conditioning system 10 is equipped with a refrigerating machine 16 which comprises a refrigerant circuit 18, through which flows a two-phase refrigerant, for example R134A ($CH_2F$—$CF_3$), $CO_2$ or R245fa (1,1,1,3,3-pentafluoropropane), and a refrigerant compressor 20 arranged in the refrigerant circuit 18. The refrigerant compressor 20 is driven by a first electric motor 22. The refrigerant circuit 18 is thermally coupled to the ambient air line, in order to transfer heat, from the ambient air flowing through the ambient air line 12, to the refrigerant circulating in the refrigerant circuit 18, before the ambient air is supplied into the mixer 14. Besides the refrigerant compressor 20, there are arranged in the refrigerant circuit 18 a condenser 24, a refrigerant collector 26, an expansion valve 28 and a heat exchanger 30, in particular an evaporator, which thermally couples the refrigerant circuit 18 to the ambient air line 12.

The refrigerant circuit 18 of the refrigerating machine 16 is further thermally coupled to a recirculation air line 32, through which recirculation air flows and which is connected to the mixer 14 of the aircraft air conditioning system 10, in order to transfer heat, from the recirculation air flowing through the recirculation air line 32, to the refrigerant flowing through the refrigerant circuit 18. The thermal coupling between the refrigerant circuit 18 and the recirculation air line 32 is realized by a further heat exchanger 34, in particular an evaporator, which is arranged in a connecting line 36 branching off from the refrigerant collector 26 arranged in the refrigerant circuit 18. The refrigerant flow through the connecting line 36 is controlled by a control valve 38 arranged in the connecting line 36. Further, in the connecting line 36 there is arranged, upstream of the further heat exchanger 34 with reference to the flow direction of the refrigerant through the refrigerant circuit 18, a further expansion valve 40. Through the further expansion valve 40, the pressure and the temperature of the refrigerant flowing through the connecting line 36 can be set as desired before the refrigerant is conducted into the further heat exchanger 34.

In the aircraft air conditioning system 10, the refrigerating machine 16 is thus used not only for cooling the ambient air flowing through the ambient air line 12, but also for cooling recirculation air discharged from the aircraft cabin to be air conditioned. The recirculation air can therefore be cooled, before it is supplied into the mixer 14 of the aircraft air conditioning system 10, to the same low temperature as the ambient air flowing through the ambient air line 12. Consequently, it is possible to dispense with cooling of the ambient air to a temperature lying below a desired set cabin supply air temperature by heat transfer to the refrigerant circulating in the refrigerant circuit 18 of the refrigerating machine 16. Further, an operation of the refrigerating machine 16 at relatively high minimum refrigerant temperatures is made possible.

The ambient air line 12 comprises a first section 12a, in which a first ambient air compressor 42 for compressing the ambient air flowing through the first section 12a of the ambient air line 12 is arranged. The speed-regulated first ambient air compressor 42 is driven by a second electric motor 44. The first ambient air compressor is controlled by a control device 46 of the aircraft air conditioning system 10 in such a way that it compresses the ambient air, flowing through the first section 12a of the ambient air line 12, to the set cabin pressure in the aircraft cabin to be air conditioned. In the first section 12a of the ambient air line 12 there is further arranged a first valve 48 for controlling the ambient air flow through the first section 12a of the ambient air line 12.

In the first section 12a of the ambient air line 12 there is further arranged a first pre-cooler 50 for pre-cooling ambient air compressed by the first ambient air compressor 42. The first pre-cooler 50 is arranged in a ram air duct 52 and, in the operation of the aircraft air conditioning system 10, ram air conducted through the ram air duct 52 flows through it. In the first pre-cooler 50 the ambient air which has been heated by the compression in the first ambient air compressor 42 is cooled to a desired lower temperature again.

A first bypass line 54 runs parallel to the first section 12a of the ambient air line 12. A second valve 56 arranged in the first bypass line 54 serves to control the ambient air flow through the first bypass line 54. Ambient air which flows through the first bypass line 54 is conducted past the first section 12a of the ambient air line 12 and consequently the first ambient air compressor 42 and the first pre-cooler 50.

The ambient air line 12 further comprises a second section 12b which is arranged, with reference to the flow direction of the ambient air through the ambient air line 12, downstream of the first section 12a of the ambient air line 12 and the first bypass line 54. The ambient air supplied to the second section 12b of the ambient air line 12 can consequently be conducted from the first section 12a of the ambient air line 12 or the first bypass line 54 into the second section 12b of the ambient air line 12. In the second section 12b of the ambient air line 12 there is arranged a second ambient air compressor 58 for compressing the ambient air flowing through the second section 12b of the ambient air line 12, it being possible for ambient air pre-compressed by the first ambient air compressor 42 or untreated ambient air from the first bypass line 54 to be supplied to the second ambient air compressor 58. The speed-regulated second ambient air compressor 58 is driven by a third electric motor 60.

The second ambient air compressor 58 is controlled by the control device 46 of the aircraft air conditioning system 10 in such a way that it compresses the ambient air, flowing through the second section 12b of the ambient air line 12, to a pressure which is greater than the set cabin pressure in the aircraft cabin to be air conditioned. However, the operation of the first and of the second ambient air compressor 42, 58 are controlled in such a way that the temperature of the compressed ambient air does not exceed a maximum temperature of, for example, 160° C. A third valve 62 arranged in the second section 12b of the ambient air line 12 serves to control the ambient air flow through the second section 12b of the ambient air line 12.

The aircraft air conditioning system 10 further comprises a second bypass line 64 which runs parallel to the second section 12b of the ambient air line 12. In the second bypass line 64 there is arranged a fourth valve 66 which controls the ambient air flow through the second bypass line 64. Ambient air which flows through the second bypass line 64 is conducted past the second section 12b of the ambient air line 12 and consequently the second ambient air compressor 58.

The ambient air line 12 further comprises a third section 12c which is arranged, with reference to the flow direction of the ambient air through the ambient air line 12, downstream of the second section 12b of the ambient air line and the second bypass line 64. The ambient air supplied to the third section 12c of the ambient air line 12 can consequently be conducted from the second section 12b of the ambient air line 12, or, via the second bypass line 64 bypassing the second section 12b of the ambient air line 12, from the first section 12a of the ambient air line 12, into the third section 12c of the ambient air line 12. The third section 12c of the ambient air line 12 is thermally coupled to the refrigerant circuit 18 via the heat exchanger 30 arranged in the refrigerant circuit 18 of the refrigerating machine 16. The cooling of the ambient air in the ambient air line 12 by heat transfer to the refrigerant circulating in the refrigerant circuit 18 of the refrigerating machine 16 takes place, accordingly, on flowing through the third section 12c of the ambient air line 12.

In the third section 12c of the ambient air line 12 there is arranged a second pre-cooler 68 for pre-cooling ambient air before the establishment of the thermal coupling between the third section 12c of the ambient air line 12 and the refrigerating circuit 18 of the refrigerating machine 16. The second pre-cooler 68 is arranged in the ram air duct 52, with reference to the flow direction of the ram air through the ram air duct, upstream of the first pre-cooler 50 and, similar to the first pre-cooler 50, ram air conducted through the ram air duct 52 flows through it in the operation of the aircraft air conditioning system 10.

Besides the first and the second pre-cooler 50, 68, the condenser 24 of the refrigerating machine 16 is also arranged in the ram air duct 52, the condenser 24, with reference to the flow direction of the ram air through the ram air duct 52, being positioned in the ram air duct 52 upstream of the second pre-cooler 68. In order to ensure a proper throughflow of ram air through the ram air duct 52 when an aircraft equipped with the aircraft air conditioning system 10 is on the ground as well, a fan 70 is further arranged in the ram air duct 52 in order to convey ram air through the ram air duct 52. The fan 70 is driven by a fourth electric motor 72.

A trim air line 74 branches off from the third section 12c of the ambient air line 12, with reference to the flow direction of the ambient air through the ambient air line 12, upstream of the second pre-cooler 68. The trim air flow through the trim air line 74 is controlled by a trim air valve 76 arranged in the trim air line 74.

The ambient air line 12 of the aircraft air conditioning system 10 further comprises a fourth section 12d which, with reference to the flow direction of the ambient air through the ambient air line 12, is arranged downstream of the third section 12c of the ambient air line 12. In the fourth section 12d of the ambient air line 12 there is arranged a water separating device 78 which comprises a water separator 80 and a reheater 82. On flowing through the water separator 80 the ambient air is dehumidified to such an extent that it is ensured that not too much moisture is supplied to the aircraft cabin to be air conditioned. Water separated from the ambient air in the water separator 80 is conducted via a drainage line 84 into the ram air duct 52 and via a water injection nozzle 87 into the ram air duct 52. In doing so, the water evaporates partly and cools the ram air flowing through the ram air duct 52.

Further, in the fourth section 12d of the ambient air line 12 there is arranged a turbine 86 for expanding the ambient air flowing through the fourth section 12d of the ambient air line 12. The turbine 86, having the second ambient air compressor 58 arranged in the second section 12b of the ambient air line 12, is arranged on a common shaft. The reheater 82, arranged downstream of the water separator 80 with reference to the flow direction of the ambient air through the ambient air line 12, serves to heat ambient air flowing through the fourth section 12d of the ambient air line 12 before it is supplied into the turbine 86, and establishes a thermal coupling between the fourth section 12d of the ambient air line 12 and the second section 12b of the ambient air line 12. As a result, the reheater 82 brings hot ambient air, flowing through the second section 12b of the ambient air line 12 after its compression in the second ambient air compressor 58, into thermal contact with the ambient air, flowing through the fourth section 12d of the ambient air line 12, before it is supplied into the turbine 86. In the reheater 82, water drops remaining in the ambient air flow after flowing through the water separator 80 are evaporated in order to protect the turbine 86 from damage due to drop impingement or cavitation. Furthermore, the reheater 82 increases the power output of the turbine 86.

Finally, in the fourth section 12d of the ambient air line 12 there is arranged a fifth valve 88 for controlling the ambient air flow through the fourth section 12d of the ambient air line 12.

The aircraft air conditioning system 10 further comprises a third bypass line 90 which runs parallel to the fourth section 12d of the ambient air line 12. In the third bypass line 90 there is arranged a sixth valve 92 for controlling the ambient air flow through the third bypass line 90. Ambient air which flows through the third bypass line 90 is conducted past the fourth section 12d of the ambient air line 12 and consequently the water separating device 78 and the turbine 86.

In cooperation with an ambient air compressor 42, 58, in particular the second ambient air compressor 58, which compresses the ambient air flowing through the second section 12b of the ambient air line 12 to a pressure which is greater than the set cabin pressure in the aircraft cabin to be air conditioned, the turbine 86 arranged in the fourth section 12d of the ambient air line 12 enables the realization of a cold air process in which the ambient air flowing through the ambient air line 12 is firstly compressed and then expanded again and in so doing cooled. The compression of the ambient air to a pressure lying above the set cabin pressure enables excess water in the water separating device 78 arranged in the fourth section 12d of the ambient air line 12 to be removed from the ambient air flow. Owing to the expansion of the ambient air in the turbine 86, the ambient air is cooled to a desired low temperature before it is supplied into the mixer of the aircraft air conditioning system.

In the aircraft air conditioning system, accordingly, as required, either exclusively the cold vapor process taking place in the refrigerating machine 16, or both the cold vapor process and the cold air process, may be used for conditioning and cooling the ambient air flowing through the ambient air line 12. An operation of the aircraft air conditioning system with exclusive use of the cold vapor process is suitable in particular in operating phases of the aircraft air conditioning system 10 in which the ambient air flowing through the ambient air line has only a low moisture content. An operation of the aircraft air conditioning system 10 using both the cold vapor process and the cold air process is expedient in particular if the ambient air flowing through the ambient air line 12 has to be dehumidified before it is supplied into the mixture 14 of the aircraft air conditioning system 10.

Finally, by switching off the refrigerating machine 16, an operation of the aircraft air conditioning system 10 using exclusively the cold air process is possible. This is expedient if the aircraft cabin is to be heated by means of the aircraft air conditioning system 10. An operation of the aircraft air conditioning system 10 using exclusively the cold air process is also possible as an emergency operation in the event of a failure of the refrigerating machine 16. In such an emergency operation, both ambient air compressors 42, 58 may be used for compressing the ambient air flowing through the ambient air line 12, whereby it becomes possible to supply the aircraft cabin with a sufficient amount of conditioned and cooled ambient air even if, in an aircraft air conditioning system 10 equipped with two air conditioning units, one air conditioning unit completely fails and in addition the refrigerating machine of the second air conditioning unit is no longer capable of functioning.

The control device 46 controls the ambient air flow through the ambient air line 12 by appropriate control of the valves 48, 56, 62, 66, 88, 92 in such a way that the ambient air is firstly conducted selectively through the first section 12a of the ambient air line 12 or the first bypass line 54, the ambient air is subsequently selectively conducted through the second section 12b of the ambient air line 12 or the second bypass line 64, the ambient air is subsequently conducted through a third section 12c of the ambient air line 12 and the ambient air is subsequently selectively conducted through the fourth section 12d of the ambient air line 12 or the third bypass line 90.

In particular, the control device 46 controls the operation of the aircraft air conditioning system 10 and the ambient air flow through the ambient air line 12 in such a way that when an aircraft equipped with the aircraft air conditioning system 10 is on the ground the ambient air is firstly conducted through the first bypass line 54, subsequently through the second section 12b of the ambient air line 12, subsequently through the third section 12c of the ambient air line 12 and finally through the fourth section 12d of the ambient air line 12. When an aircraft equipped with the aircraft air conditioning system 10 is on the ground the ambient air is thus compressed, on flowing through the second ambient air compressor 58, to a pressure lying above the set cabin pressure which enables a dehumidification of the ambient air in the water separating device 78. In contrast, the first ambient air compressor 42 is bypassed. The cooling of the ambient air is effected both by the transfer of heat to the refrigerant circuit 18 of the refrigerating machine 16 and by the expansion of the ambient air in the turbine 86.

By contrast, when an aircraft equipped with the aircraft air conditioning system 10 is climbing or descending, the control device 46 controls the ambient air flow through the ambient air line 12 in such a way that the ambient air is firstly conducted through the first section 12a of the ambient air line 12, subsequently through the second section 12b of the ambient air line 12, subsequently through the third section 12c of the ambient air line 12 and finally through the fourth section 12d of the ambient air line 12. Thus, when an aircraft equipped with the aircraft air conditioning system 10 is climbing or descending, the first ambient air compressor 42 and the second ambient air compressor 58 are connected in series in order to compress the ambient air flowing through the ambient air line 12 to a pressure which enables a dehumidification of the ambient air in the water separating device 78 even if the efficiency of the water separator 80 decreases. Through the series connection of the ambient air compressors 42, 58, both ambient air compressors 42, 58 can be operated at high power requirements in their optimal map range. The cooling of the ambient air is effected, as on the ground, both by the transfer of heat to the refrigerant circuit 18 of the refrigerating machine 16 and by the expansion of the ambient air in the turbine 86.

Finally, when an aircraft equipped with the aircraft air conditioning system 10 is cruising, the control device 46 controls the ambient air flow through the ambient air line 12 in such a way that the ambient air is conducted firstly through the first section 12a of the ambient air line 12, subsequently through the second bypass line 64, subsequently through the third section 12c of the ambient air line 12 and finally through the third bypass line 90. Thus, when an aircraft equipped with the aircraft air conditioning system 10 is cruising, the ambient air flowing through the ambient air line 12 is compressed to the set cabin pressure exclusively by the first ambient air compressor 42, since a dehumidification of the ambient air which is very dry when an aircraft is at cruising altitude is not necessary. Accordingly, the second ambient air compressor 58 is bypassed as are the water separating device 78 and the turbine 86. The cooling of the ambient air is effected exclusively by the transfer of heat to the refrigerant circuit 18 of the refrigerating machine 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system comprising:
an ambient air line, configured to have ambient air flow therethrough and which is connected to a mixer of the aircraft air conditioning system to supply ambient air to the mixer, and
a refrigerating machine which comprises a refrigerant circuit configured to have a refrigerant flow therethrough, the refrigerant circuit being thermally coupled to the ambient air line to transfer heat, from the ambient air flowing through the ambient air line, to the refrigerant circulating in the refrigerant circuit, before the ambient air is supplied into the mixer,
wherein a controller is configured to control the ambient air flow through the ambient air line such that
the ambient air is firstly selectively conducted either through a first section of the ambient air line, in which a first ambient air compressor for compressing the ambient air flowing through the first section of the ambient air line is arranged, or a first bypass line running parallel to the first section of the ambient air line, the ambient air is subsequently selectively conducted either through a second section of the ambient air line, in which a second ambient air compressor for compressing the ambient air flowing through the second section of the ambient air line is arranged, or a second bypass line running parallel to the second section of the ambient air line, the ambient air is subsequently conducted through a third section of the ambient air line which is thermally coupled to the refrigerant circuit of the refrigerating machine, and the ambient air is subsequently selectively conducted either through a fourth section of the ambient air line, in which a turbine for expanding the ambient air flowing through the fourth section of the ambient air line is arranged, or a third bypass line running parallel to the fourth section of the ambient air line.

2. The aircraft air conditioning system according to claim 1, wherein the control device is configured to control the first ambient air compressor such that the first ambient air compressor compresses the ambient air flowing through the first section of the ambient air line to a pressure which corresponds substantially to a set cabin pressure in an aircraft cabin to be air conditioned.

3. The aircraft air conditioning system according to claim 1, wherein at least one of the control device is configured to control the second ambient air compressor such that the second ambient air compressor compresses the ambient air flowing through the second section of the ambient air line to a pressure which is greater than the set cabin pressure in the aircraft cabin to be air conditioned, or a water separating device is arranged in the fourth section of the ambient air line.

4. The aircraft air conditioning system according to claim 1, wherein the control device is configured to control the ambient air flow through the ambient air line such that when an aircraft equipped with the aircraft air conditioning system is on the ground the ambient air is firstly conducted through the first bypass line, subsequently through the second section of the ambient air line, subsequently through the third section of the ambient air line and finally through the fourth section of the ambient air line.

5. The aircraft air conditioning system according to claim 1, wherein the control device is configured to control the ambient air flow through the ambient air line such that when an aircraft equipped with the aircraft air conditioning system is climbing or descending the ambient air is firstly conducted through the first section of the ambient air line, subsequently through the second section of the ambient air line, subsequently through the third section of the ambient air line and finally through the fourth section of the ambient air line.

6. The aircraft air conditioning system according to claim 1, wherein the control device is configured to control the ambient air flow through the ambient air line such that when an aircraft equipped with the aircraft air conditioning system is cruising, the ambient air is firstly conducted through the first section of the ambient air line, subsequently through the second bypass line, subsequently through the third section of the ambient air line and finally through the third bypass line.

7. The aircraft air conditioning system according to claim 1, further comprising at least one electric motor for driving at least one of the first, the second ambient air compressor, or a refrigerant compressor arranged in the refrigerant circuit of the refrigerating machine.

8. The aircraft air conditioning system according to claim 7, wherein at least one of the refrigerant circulating in the refrigerant circuit of the refrigerating machine is a two-phase refrigerant, or in the refrigerant circuit of the refrigerating machine, besides the refrigerant compressor driven by a first electric motor, there are further arranged a condenser, a refrigerant collector, an expansion valve and a heat exchanger, in the form of an evaporator, which thermally couples the refrigerant circuit to the ambient air line.

9. The aircraft air conditioning system according to claim 1, wherein the refrigerant circuit of the refrigerating machine is thermally coupled to a recirculation air line configured to have recirculation air flow therethrough in order to transfer heat from the recirculation air flowing through the recirculation air line to the refrigerant circulating in the refrigerant circuit.

10. The aircraft air conditioning system according to claim 8, wherein the refrigerant circuit of the refrigerating machine is thermally coupled to a recirculation air line configured to have recirculation air flow therethrough in order to transfer heat from the recirculation air flowing through the recirculation air line to the refrigerant circulating in the refrigerant circuit and wherein the refrigerant circuit of the refrigerating machine is thermally coupled to the recirculation air line via a further heat exchanger, in the form of a further evaporator, which is arranged in a connecting line branching off from the refrigerant collector arranged in the refrigerant circuit, there further being arranged in the connecting line at least one of a control valve configured to control the refrigerant flow through the connecting line, or a further expansion valve.

11. The aircraft air conditioning system according to claim 1, further comprising at least one of:

a first valve arranged in the first section of the ambient air line and configured to control the ambient air flow through the first section of the ambient air line, a first pre-cooler, arranged in the first section of the ambient air line, for pre-cooling ambient air compressed by the first ambient air compressor, a second valve arranged in the first bypass line and configured to control the ambient air flow through the first bypass line, a third valve arranged in the second section of the ambient air line and configured to control the ambient air flow through the second section of the ambient air line, a fourth valve arranged in the second bypass line and configured to control the ambient air flow through the second bypass line, a second pre-cooler, arranged in the third section of the ambient air line, for pre-cooling ambient air before the establishment of the thermal coupling between the third section of the ambient air line and the refrigerant circuit, a trim air line branching off from the third section of the ambient air line, a fifth valve which is arranged in the fourth section of the ambient air line and is configured to control the ambient air flow through the fourth section of the ambient air line, or a sixth valve which is arranged in the third bypass line and is configured to control the ambient air flow through the third bypass line.

12. A method for operating an aircraft air conditioning system, comprising:
conducting ambient air through an ambient air line connected to a mixer of the aircraft air conditioning system in order to supply ambient air to the mixer,
thermally coupling a refrigerant circuit of a refrigerating machine to the ambient air line to transfer heat, from the ambient air flowing through the ambient air line, to the refrigerant circulating in the refrigerant circuit, before the ambient air is supplied into the mixer, and
controlling the ambient air flow through the ambient air line such that
the ambient air is firstly selectively conducted through a first section of the ambient air line, in which a first ambient air compressor for compressing the ambient air flowing through the first section of the ambient air line is arranged, or a first bypass line running parallel to the first section of the ambient air line,
the ambient air is subsequently selectively conducted through a second section of the ambient air line, in which a second ambient air compressor for compressing the ambient air flowing through the second section of the ambient air line is arranged, or a second bypass line running parallel to the second section of the ambient air line,
the ambient air is subsequently conducted through a third section of the ambient air line which is thermally coupled to the refrigerant circuit of the refrigerating machine, and
the ambient air is subsequently selectively conducted through a fourth section of the ambient air line, in which a turbine for expanding the ambient air flowing through the fourth section of the ambient air line is arranged, or a third bypass line running parallel to the fourth section of the ambient air line.

13. The method according to claim 12, wherein at least one of:
the first ambient air compressor is controlled such that the first ambient air compressor compresses the ambient air flowing through the first section of the ambient air line to a pressure which corresponds substantially to a set cabin pressure in an aircraft cabin to be air conditioned, or
the second ambient air compressor is controlled such that the second ambient air compressor compresses the ambient air flowing through the second section of the ambient air line to a pressure greater than the set cabin pressure in the aircraft cabin to be air conditioned, water being separated from the ambient air flowing through the fourth section of the ambient air line.

14. The method according to claim 12, wherein the ambient air flow through the ambient air line is controlled such that at least one of
when an aircraft equipped with the aircraft air conditioning system is on the ground, the ambient air is firstly conducted through the first bypass line, subsequently through the second section of the ambient air line, subsequently through the third section of the ambient air line and finally through the fourth section of the ambient air line,
when an aircraft equipped with the aircraft air conditioning system is climbing or descending the ambient air is firstly conducted through the first section of the ambient air line, subsequently through the second section of the ambient air line, subsequently through the third section of the ambient air line and finally through the fourth section of the ambient air line, or
when an aircraft equipped with the aircraft air conditioning system is cruising the ambient air is firstly conducted through the first section of the ambient air line, subsequently through the second bypass line, subsequently through the third section of the ambient air line and finally through the third bypass line.

15. The method according to claim 12, wherein at least one of:
the ambient air flow through the first section of the ambient air line is controlled by a first valve arranged in the first section of the ambient air line,
ambient air compressed by the first ambient air compressor is pre-cooled by a first pre-cooler arranged in the first section of the ambient air line,
the ambient air flow through the first bypass line is controlled by a second valve arranged in the first bypass line,
the ambient air flow through the second section of the ambient air line is controlled by a third valve arranged in the second section of the ambient air line,
the ambient air flow through the second bypass line is controlled by a fourth valve arranged in the second bypass line,
ambient air is pre-cooled by a second pre-cooler arranged in the third section of the ambient air line before the establishment of the thermal coupling between the third section of the ambient air line and the refrigerant circuit,
trim air is branched off from the ambient air flowing through the third section of the ambient air line by a trim air line branching off from the third section of the ambient air line,
the ambient air flow through the fourth section of the ambient air line is controlled by a fifth valve arranged in the fourth section of the ambient air line, or
the ambient air flow through the third bypass line is controlled by a sixth valve arranged in the third bypass line.

* * * * *